United States Patent
Ticknor (10) Patent No.: US 10,241,758 B2
(45) Date of Patent: Mar. 26, 2019

(54) SYSTEM AND METHOD FOR SERVING MULTIPLE DATA OBJECTS AND FORMATTING FUNCTIONS IN A SINGLE REQUEST

(71) Applicant: International Business Machines Corporation, Armonk, NY (US)

(72) Inventor: Michael W. Ticknor, Valdosta, GA (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 15/153,289

(22) Filed: May 12, 2016

(65) Prior Publication Data

US 2016/0259629 A1 Sep. 8, 2016

Related U.S. Application Data

(63) Continuation of application No. 13/604,538, filed on Sep. 5, 2012, now Pat. No. 9,361,276, which is a (Continued)

(51) Int. Cl.
*G06F 8/00* (2018.01)
*G06F 8/30* (2018.01)
(Continued)

(52) U.S. Cl.
CPC .............. *G06F 8/31* (2013.01); *G06F 8/30* (2013.01); *G06F 17/211* (2013.01);
(Continued)

(58) Field of Classification Search
CPC .... G06F 17/211; G06F 17/30412; G06F 8/31; G06F 8/30; G06F 17/30607
See application file for complete search history.

(56) References Cited

U.S. PATENT DOCUMENTS 5,737,599 A 4/1998 Rowe et al.
5,819,301 A 10/1998 Rowe et al.
(Continued)

FOREIGN PATENT DOCUMENTS

AU 2013204166 B2 4/2014

OTHER PUBLICATIONS

Acimovic, "Lowering Outbound Shipping Costs in an Online Retail Environment by Making Better Fulfillment and Replenishment Decisions" Ph.D. Thesis, Massachusetts Institute of Technology, Sep. 2012, pp. 1-198.

*Primary Examiner* — Stephen S Hong
*Assistant Examiner* — Marshon L Robinson
(74) *Attorney, Agent, or Firm* — Scully, Scott, Murphy & Presser, P.C.; Scott Dobson, Esq.

(57) ABSTRACT

Disclosed is a novel framework by which the sources of data objects and/or formatting functions can be easily requested and managed. More specifically, the invention provides a system for and method of serving multiple data objects and/or formatting functions to a subscribing client via a single request. The system comprises a catalog with entries referencing components used to generate data objects and formatting functions, each of which has a unique identifier; and an engine for receiving requests from the subscribing client, wherein each request includes one or more catalog identifiers. This engine, for each identifier in each received request, executes any prerequisite components, sets the appropriate parameters, and executes the component referenced by said component identifier to obtain the requested data object or formatting function. Having executed each said component, said engine protects the namespaces of the returned functions and variables and aggregates said data objects and/or formatting functions into a script library, and returns said script library to said subscribing client.

20 Claims, 3 Drawing Sheets

Related U.S. Application Data continuation of application No. 11/330,210, filed on Jan. 10, 2006, now Pat. No. 8,301,997.

(51) Int. Cl.
*G06F 17/21* (2006.01)
*G06F 17/30* (2006.01)
*H04L 29/08* (2006.01)

(52) U.S. Cl.
CPC .. *G06F 17/30412* (2013.01); *G06F 17/30607* (2013.01); *H04L 67/02* (2013.01)

(56) References Cited

U.S. PATENT DOCUMENTS

| | | | |
|---|---|---|---|
| 6,038,601 | A | 3/2000 | Lambert et al. |
| 6,269,403 | B1 | 7/2001 | Anders |
| 6,604,144 | B1 | 8/2003 | Anders |
| 6,629,138 | B1 | 9/2003 | Lambert et al. |
| 6,785,769 | B1 | 8/2004 | Jacobs et al. |
| 6,822,663 | B2 | 11/2004 | Wang et al. |
| 7,069,497 | B1 | 6/2006 | Desai |
| 7,124,140 | B2 | 10/2006 | Barton |
| 7,287,228 | B2 | 10/2007 | Kundu et al. |
| 7,747,543 | B1 | 6/2010 | Braumoeller et al. |
| 7,925,981 | B2 | 4/2011 | Pourheidari et al. |
| 8,301,997 | B2 | 10/2012 | Ticknor |
| 8,352,382 | B1 | 1/2013 | Katta et al. |
| 8,374,922 | B1 | 2/2013 | Antony |
| 8,818,836 | B1 | 8/2014 | Braumoeller et al. |
| 2002/0002569 | A1 | 1/2002 | Nguyen et al. |
| 2002/0049788 | A1* | 4/2002 | Lipkin |
| 2002/0133570 | A1 | 9/2002 | Michel |
| 2002/0143819 | A1* | 10/2002 | Han |
| 2002/0149615 | A1* | 10/2002 | Rajarajan |
| 2002/0161848 | A1 | 10/2002 | Willman et al. |
| 2002/0194227 | A1 | 12/2002 | Day et al. |
| 2003/0005411 | A1* | 1/2003 | Gerken |
| 2003/0009488 | A1 | 1/2003 | Hart, III |
| 2003/0091016 | A1 | 5/2003 | Ko et al. |
| 2003/0115546 | A1 | 6/2003 | Dubey et al. |
| 2003/0163784 | A1 | 8/2003 | Daniel et al. |
| 2003/0188021 | A1 | 10/2003 | Challenger et al. |
| 2004/0024688 | A1 | 2/2004 | Bi et al. |
| 2004/0177319 | A1* | 9/2004 | Horn |
| 2004/0187076 | A1 | 9/2004 | Ki et al. |
| 2004/0192349 | A1 | 9/2004 | Reilly |
| 2004/0205578 | A1 | 10/2004 | Wolff et al. |
| 2004/0230674 | A1 | 11/2004 | Pourheidari et al. |
| 2005/0071418 | A1 | 3/2005 | Kjellberg et al. |
| 2005/0071486 | A1 | 3/2005 | Vu et al. |
| 2005/0108624 | A1 | 5/2005 | Carrier |
| 2005/0182843 | A1* | 8/2005 | Reistad |
| 2007/0162843 | A1 | 7/2007 | Ticknor |
| 2012/0150583 | A1 | 6/2012 | Dueck et al. |
| 2012/0150692 | A1 | 6/2012 | Dueck et al. |
| 2013/0060894 | A1 | 3/2013 | Ticknor |
| 2015/0052019 | A1 | 2/2015 | Field-Darraugh et al. |

\* cited by examiner

SYSTEM AND METHOD FOR SERVING MULTIPLE DATA OBJECTS AND FORMATTING FUNCTIONS IN A SINGLE REQUEST

CROSS REFERENCE TO RELATED APPLICATION

This application is a continuation of copending application Ser. No. 13/604,538, filed Sep. 5, 2012, which is a continuation of application Ser. No. 11/330,210, filed Jan. 10, 2006. The entire contents and disclosures of application Ser. Nos. 13/604,538 and 11/330,210 are hereby incorporated herein by reference.

BACKGROUND OF THE INVENTION

1. Field of the Invention

This invention generally relates to Web pages, and more specifically, the invention relates to providing or adding sections of content to Web pages. Even more specifically, the preferred embodiment of the invention relates to systems and methods for serving multiple data objects and formatting functions in a single request.

2. Background Art

The use of a client side scripting language library, such as a JavaScript library, that provides dynamically generated content is a relatively new approach to embedding one or more sections of content on a web page. This approach has many advantages. Because it requires no server-to-server integration between the server hosting the web page and the server hosting the JavaScript library, a web page developer simply embeds a URL to one or more JavaScript libraries (possibly along with a few line of JavaScript code) and the dynamic content provided by the JavaScript library is added to the page. This significantly reduces the complexities required to integrate third party content into a web page. Because there is no server-to-server integration, there is no need to worry about software compatibility between the server generating the web page and the server providing the third-party content. Also, there is no need for the web page developer to work with a server-side API to integrate the embedded content into the web page. This is because the integration occurs when the page is rendered by the browser, not when the client-side markup language, such as HTML, is being generated on the web server.

Typically, the dynamically generated JavaScript library provides a function to embed its content onto the web page. Optionally, CSS (or similar technology) is used to adjust the "look and feel" of the content to more closely match that of the including page. A disadvantage of this approach is that if the formatting of the content provided by the JavaScript library does not provide the formatting desired for the including page, then a new JavaScript library must be created to provide content with the desired format. This additional JavaScript library uses the same or similar set of data as the first JavaScript library, but provides this data in a different content format. As more variations of these dynamically generated JavaScript libraries are created for various content formats, updates across all variations can become difficult to maintain. Also, each additional dynamically generated JavaScript library must interface with whatever back-end system is providing the data.

An improvement to this approach is to have the JavaScript library generate the data component of the content without specifying the content formatting. Then, any number of independent formatting functions can be created. Each of these formatting functions can take the same type of data object as a parameter, but use this data to output content in very different formats. This approach provides a much greater degree of flexibility. For each new content format that is needed, there is no longer a need to create multiple variations of the data object. Formatting functions can now be provided by any server, completely independent from the server providing the data object. No integration or awareness is needed between the server providing the data object and the server providing the formatting function. The only requirement is that the formatting function be written in a way that is compatible with the data object that it receives as a parameter.

A key disadvantage of the above-discussed approaches is that when a page needs to embed many different sections of dynamically generated content, this page must submit a separate request to obtain each data object and formatting function needed on the page. This can result in several requests to the server(s) hosting the data objects and formatting functions. This need to send multiple requests impacts the response time of the page containing the multiple sections of embedded content.

Another disadvantage is that the URI to each data object and formatting function must be specified by every page wishing to include this content. If the URI of a data object or formatting function needs to change, every page using this URI must be updated when the change occurs, or the embedded section of content will no longer work on this page.

One example of a section of content that may be added to Web pages is work embedded learning, which can be defined as learning content (or links to learning content, or connections to experts that can provide learning) that is provided within the context of performing a specific task. Key characteristics of work embedded learning are that the learning content changes based on page context (i.e., the primary information or task on a web page) and, possibly, based on attributes of the user accessing this page (i.e., different content may be provided for users in a different job role, geographic location, organization, etc.). Work embedded learning offers significant business value through enhanced employee performance.

Two of the past approaches to providing work embedded learning (and other sections of content on a page) have been:
 1. Manually adding supporting content to each page; and
 2. Integrating the supporting content with the primary page content via a web application server or other server-side program.

The problem with the first approach is that updates to the content or functionality of supporting content require manual changes to each page. This quickly becomes a time-consuming, error-prone process if this approach is used for more than a few hundred pages. Also, custom content based on user attributes is not possible with this approach.

The second approach resolves the data management issues introduced by the first approach, however, it too has fundamental limitations. The system providing the work embedded learning (A) must run on the same server as the application generating the primary content, or (B) must be accessed by the primary application server via an API over the network (i.e., a SOAP interface, CORBA, COM, etc.).

A key disadvantage of limitation (A) is that the supporting content application code must be deployed onto every application server wishing to use this supporting content. This introduces additional resource and performance demands on this application server. Also, it requires that the supporting content application code be compatible with the application server in question. If the supporting content application code runs on a different application platform (i.e., .NET vs. J2EE vs. Domino) or if it requires a different version of the same platform, the primary application platform must be upgraded (or downgraded), or the supporting content application simply cannot be used. None of these alternatives is desirable.

While approach (B) does not require compatible application server platforms, it does require that an API be available on the primary platform for communicating to the supporting content application server over the network. If a compatible API is not available, one must be developed. Also, approach (B) requires a network connection to pass data from the supporting content application server to the primary application server. This introduces a potentially significant performance hit and/or additional complexity and resource demands (such as an advanced caching strategy), especially for personalized, context sensitive, or language-specific supporting content.

Approaches (A) and (B) also typically have a development and testing cost associated with integrating the primary page content with the supporting content API. Also, it is important to note that neither approach (A) nor (B) is capable of embedding supporting content into static HTML pages, or into dynamic pages running on an application server that does not have a compatible API for communicating with the supporting content application.

SUMMARY OF THE INVENTION

An object of this invention is to provide Web pages with multiple data objects and/or formatting functions via a single request to a server.

Another object of the present invention is to provide a framework by which the sources of data objects and/or formatting functions provided by a server can be easily requested and managed.

A further object of the invention is to provide a mechanism through which a subscribing client can obtain multiple data objects and/or formatting functions from a server in a single request.

Another object of this invention is to leverage this mechanism to add work embedded learning to a Web page.

These and other objectives are attained with a novel framework by which the sources of data objects and/or formatting functions can be easily requested and managed. More specifically, the invention provides a system for and method of serving data objects and/or formatting functions to a subscribing client. The system comprises a catalog referencing components that are used for 1) generating data objects, 2) generating formatting functions, or 3) generating 'prerequisite' code that is required by one or more data object and/or formatting function; each of said components having at least one of a plurality of component identifiers; and an engine for receiving requests from the subscribing client, wherein each request includes 1) one or more of the data object and/or formatting function component identifiers, 2) zero or more parameters to be passed to this component, and 3) a 'subscription id' used to identify this data object or formatting function in the aggregated response.

The client may now use the returned data objects and formatting functions to assist in rendering sections of content on the page, or for whatever other purpose this client may have.

It may be noted that content refers to that which is ultimately visible to an end user on a client application. This includes basic content, such as text, paragraphs, and tables. However, it also includes more advanced content, such as input forms, interactive buttons and links, and other 'rich' client functionality.

It may also be helpful to note that, generally, sections of content can be included on a page via three broad techniques. These techniques are:

1) Content is rendered by a client application by obtaining a data object and formatting function in the form of JavaScript or other client side scripting language. On the client, the data object is passed as a parameter to the formatting function, which results in the client application rendering content on the page.
2) A data object and formatting function are combined on a server, resulting in 'undifferentiated content'—content not separated into its data and formatting components. The resulting content is then passed from the server to the client application. This undifferentiated content may be provided to the client in the form of a markup language (such as HTML), or in the form of a client side scripting language (such as JavaScript).
3) Content is never in a differentiated form, on the server or on the client, and so there is never a combination of data and formatting function on the server or the client. As with the second of the above-discussed techniques, this content is passed to the client in the form of a markup language or a client side scripting language.

The present invention may be used for many specific applications. For instance, the invention may be used to add work embedded learning to a Web page, based on a given context id and (optional) user id parameters. More specifically, when the invention is used in this way, a request received by the above-mentioned engine may include one or more work embedded learning data objects and/or formatting functions. In response to such a request, the engine returns the requested data objects and/or formatting functions which can then be used by the subscribing client to generate a section of work embedded learning content on the page.

The preferred embodiment of the invention, described below in detail, provides a number of important advantages. It allows a subscribing client (or a local application) to request multiple data objects and/or formatting functions via a single request, improving performance for pages that need to request multiple data objects and/or formatting functions from a single server. It provides a catalog data store to manage the id, description, location, prerequisite component ids, parameter names, parameter default values, and other attributes associated with a data object components, formatting function components, and prerequisite code components. It provides a catalog cache for easy programmatic access to this information by the engine. It provides a catalog user interface for easy access to this information by interested users, such as web page developers. It allows a page to request each data object or formatting function via a unique identifier, eliminating the need for the subscribing client to request and maintain the exact location of each component. It allows each request to pass parameters associated with each requested data object and/or formatting function. It automatically includes any prerequisite code required for the requested data objects and/or formatting functions. It automatically sets default values for any parameters needed by a data object component or formatting function component that were not provided in the request. It automatically executes the appropriate data object and/or formatting function components. It automatically protects the namespace of the variables and functions created by each data object or formatting function component. It automatically aggregates the output for each requested data object and formatting function into a single response.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
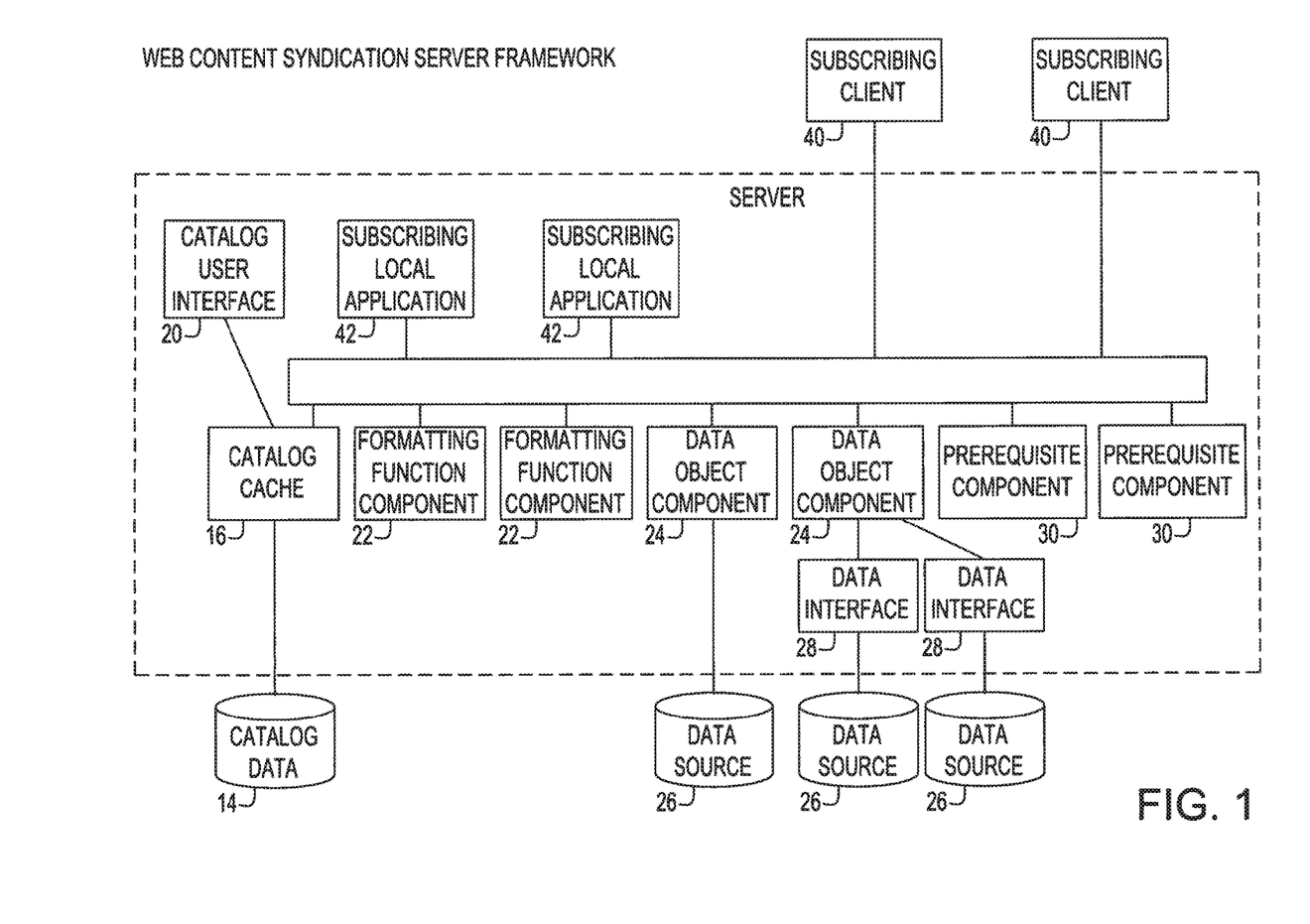
FIG. 1 shows a framework that may be used to practice the present invention.

FIG. 1 shows a framework, referred to as the Web Content Syndication (WCS) Server Framework 10, which may be employed in the practice of this invention. This preferred framework 10 comprises an Engine 12, a Catalog 14, a Catalog Cache 16, a Catalog User Interface 20, zero or more referenced formatting function components 22, zero or more referenced data object components 24, zero or more data sources 26 accessed directly or indirectly by one or more of the data object components, zero or more data interfaces 28 that can be used by one or more of the data object components to access a data source, and zero or more referenced prerequisite code components 30. FIG. 1 also shows a group of subscribing clients 40, and a group of subscribing local applications 42.

The Engine 12 is a program responsible for serving output from requested WCS components to subscribing pages. The Engine allows output from multiple data object components and formatting function components to be aggregated and served via a single request. It also allows the subscribing pages to request WCS content streams and skins via a designated ID, rather than directly referencing the location of each component. This Engine program serves two primary purposes. First, it acts as a controller for incoming requests. It breaks down a request, and uses the catalog cache to translate requested data object IDs and formatting function IDs into a command to execute the corresponding prerequisite code, data object, and formatting function components. Second, it acts as an aggregator of the output returned by each component executed, combining all output into a single response that is returned to the subscribing client.

The Catalog Data 14 is a repository used to store and to manage the id, description, location, prerequisite component ids, parameter names, parameter default values, and other attributes associated with data object components, formatting function components, and prerequisite code components. This repository may be implemented in a variety of forms, including, but not limited to, a database or an XML file.

The Catalog Cache 16 is an in-memory cache of key Catalog Data values running in close proximity to the WCS Engine. It is used by the WCS Engine to locate and call the appropriate data object, formatting function, and prerequisite code components used to serve each request. This component 16 is optional, as the WCS Engine could directly interface with the WCS Catalog. However, the WCS Catalog Cache may be used to greatly improve performance.

Catalog User Interface 20 is a user interface to the Catalog. It can be used to insert and update Catalog data. The WCS catalog User Interface can also be used to obtain key information about prerequisite, data object, and formatting function components.

The Formatting Function Components 22 are referenced in the Catalog and are the components used to generate the requested formatting functions. Each receives zero or more parameters and is executed by the engine. Each returns output in the form of a scripting language function. This returned function should be capable of receiving a data object as a parameter and returning content that can be rendered by a subscribing client.

Data Object Components 24 are referenced in the Catalog and are the components used to generate the requested data objects. Each receives zero or more parameters and is executed by the engine. Each returns output in the form of a scripting language data object. This data object can be passed to a formatting function, or can be used for any other purpose by the subscribing client.

Besides parameters being set by the engine, there are number of ways for data object components and formatting function components to obtain user data and other data from the subscribing client. For example, a browser (the subscribing client) could pass a cookie indicating the user's identity. A data object component could then use this identity to access user profile attributes associated with this person and return a personalized data object, even though the engine did not directly set a parameter indicating the user's identity.

Each data object component may access data from zero or more Data Sources 26. A data source may be, but is not limited to, a database, a structured file, or a web service.

Each data object component may access data from zero or more Data Interfaces 28. A data interface is typically comprised of one or more classes or interfaces deployed onto the same server as the data object component. A data interface is designed to take request parameters, retrieve the requested data from a data repository or internal cache, and return the resulting data in the form of an object. There are many advantages for a data object component to use a data interface when accessing a data repository. It simplifies the data object component complexity, allowing it to exclusively focus on transforming the returned object into a scripting language data object. It encourages reuse—the same data interface can also be used for many other unrelated components. In general, it is simply good design practice as it provides a clear separation of concerns between the need to access data and the need to format it as a scripting language data object.

Prerequisite Components 30 are referenced in the Catalog and are the components used to generate supporting scripting code for data objects and/or formatting functions. A prerequisite component is typically not directly requested by the subscribing client. Rather, it is automatically included in the response by the engine if one or more of the requested data objects or formatting functions have a catalog entry indicating that this prerequisite should be included.

A Subscribing Client 40 is any client capable of issuing a request to the engine and interpreting the engine response.

The most common example of a subscribing client is a web browser receiving an engine response in the form of JavaScript.

A Subscribing Local Application 42 is any code running on the same server as the engine, which submits a request to the engine. Typically, a subscribing local application will simply forward the engine response on to its calling client. An example of a subscribing local application is a Java servlet on the same server as the engine that submits a request to the engine, receives a response, and forwards the engine response back to its client along with the other output for this servlet. The advantage to this approach is that if the servlet is on the same server as the engine, it eliminates the need for the client to make one request for the web page and a second request to the engine. The client can simply request the web page, and the servlet generating this web page can automatically include the response from the engine.

Figure 2:
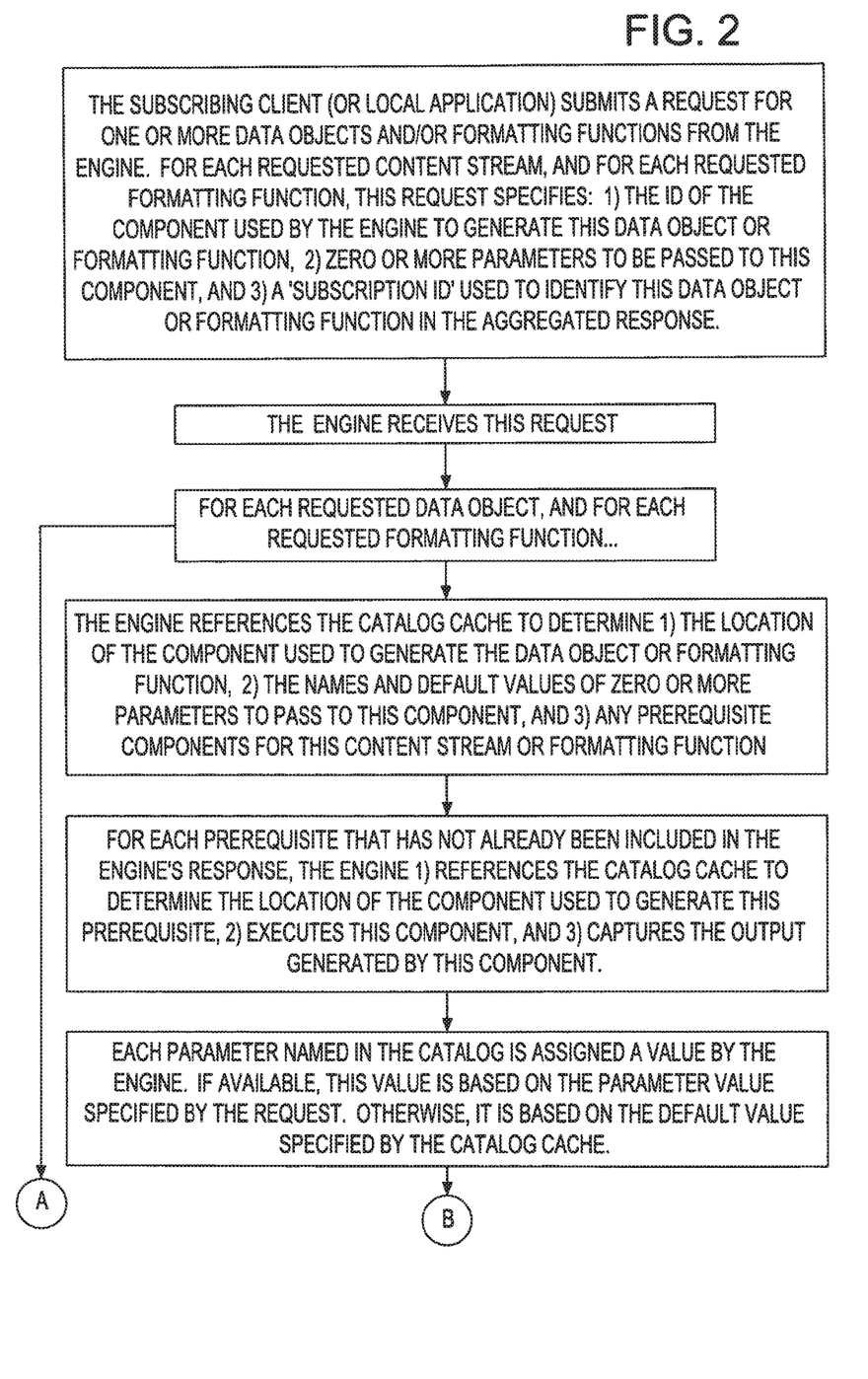
FIG. 2 is a flow chart showing how the present invention may be employed to handle a request from a subscribing client.

FIG. 2 shows the operation of engine 12 after receipt of a request for one or more data objects and/or formatting functions. In response to receiving each request, said engine, for each of the data object component identifiers, and for each of the formatting function component identifiers in said received each request, the following 5 steps 52, 54, 56, 60 and 62 are taken.

At step 52, the engine references said catalog to determine 1) the location of the requested component used to generate the data object or formatting function, 2) the names and default values of zero or more parameters to pass to this component, and 3) the identifiers of zero or more prerequisite components that are required for this content stream or formatting function.

At step 54, for each prerequisite identifier required for this component that has not already been included in the engine's response, the engine 1) references the catalog to determine the location of the component used to generate this prerequisite, 2) executes this component, and 3) captures the output generated by this component.

At step 56, the engine assigns a value to each parameter named in the catalog for this component. This value is based on the parameter value specified by said request, if a value for this parameter is provided. Otherwise, this value is based on the default value specified by the catalog.

At step 60, the engine executes the component used to generate this data object or formatting function and captures the output generated by this component.

At step 52, to protect against potential name conflicts between the functions and variables created by the output of each data object component and formatting function component, the engine 1) assigns the main function created by the output to a reference variable named after the 'subscription id' that is associated with this content stream or skin in the request, and 2) wraps the output in a protective code block so that the functions and variables created by the output are no longer visible outside of this code block. This protects the namespace of functions and variables, while allowing the subscribing client to execute the main function via the reference variable named after the specified 'subscription id'.

Once the steps 50, 52, 54, 56, 60 and 62 have been taken for each of the requested data objects and formatting functions, the engine, at step 64, aggregates and returns the cumulative output. As represented by step 66, the subscribing client receives this aggregate response.

The client may now use the returned data objects and formatting functions to assist in rendering sections of content on the page, or for whatever other purpose this client may have.

As will be appreciated by those of ordinary skill in the art, the present invention may be used for many specific applications. For instance, the invention may be used to add work embedded learning to a Web page.

One item to note is that while the Web Content Syndication (WCS) Server Framework has many advantages, it is only one of may options available to a subscribing client that needs to obtain data objects and/or formatting functions. Autonomous scripting libraries served by non-WCS Server could be included on the page. Also, data objects and/or formatting functions could be directly provided on the page itself. Each of these approaches have advantages and disadvantages. Together they provide a subscribing client a rich set of options for determining the best approach to obtaining data objects and formatting functions in a given circumstance.

It should be understood that the present invention could be realized in hardware, software, or a combination of hardware and software. Any kind of computer/server system (s)—or other apparatuses adapted for carrying out the methods described herein—is suited. A typical combination of hardware and software could be a general-purpose computer system with a computer program that, when loaded and executed, carries out the respective methods described herein. Alternatively, a specific use computer containing specialized hardware for carrying out one or more of the functional tasks of the invention could be utilized.

The present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A system for serving web content to a subscribing client for display by the subscribing client, comprising:
   a plurality of data object components to generate data objects;
   a plurality of formatting function components to generate formatting functions;
   a catalog cache of data to locate and call the data object components and the formatting function components;
   a catalog data store for referencing the data object components and the formatting function components, each of the data object components and the formatting function components having a component identifier; and
   a server computer for receiving requests from subscribing clients for web content; and
   wherein:
   each request includes at least one data object one component identifier, a formatting function component identifier, and a subscriber identifier;

in response to receiving one of the requests from one of the clients, said server computer,
i) executes the data object component and the formatting function component identified by the data object component identifier and the formatting function identifier included in the request to generate a data object and a formatting function,
ii) assigns specified names to the generated data object and to the generated formatting function to protect against name conflicts between the generated data object and formatting function including assigning the generated data object and the generated formatting function names based on information in the received one request,
iii) aggregates the generated data object and formatting function into a single response, and
iv) returns said response to said one of the clients for display by said one of the clients.

2. The system according to claim 1, wherein the specified names assigned to the generated data object and the generated formatting function are reference variables based on the information in the received one request.

3. The system according to claim 2, wherein the specified names assigned to the generated data object and the generated formatting function are based on the subscriber identifier in the received one request.

4. The system according to claim 1, wherein the server computer wraps the generated data object and the generated formatting function in a protective code block wherein the formatting function and variables created by the generated data object and formatting function are not visible outside of the protective code block.

5. The system according to claim 4, wherein the one of the clients executes the formatting function via the reference variable named after the subscription identifier.

6. The system according to claim 1, wherein said one of the clients receives said response as a single transport stream and in response to a single request made to said engine.

7. The system according to claim 1, wherein said one of the requests is for web content that enables said one of the clients to add work embedded learning to a Web page.

8. The system according to claim 1, wherein the catalog data store includes entries referencing prerequisite code components for generating supporting scripting code for data objects and formatting functions.

9. The system according to claim 1, wherein the catalog data store includes entries indicating that one or more of the data object components and the formatting function components require one or more of the prerequisite code components.

10. The system according to claim 9, wherein the catalog data store includes identifiers identifying the one or more prerequisite code components required by each of the data object components and the formatting functions that require one or more of the prerequisite code components.

11. A method of serving web content to a subscribing client for display by the subscribing client, comprising:
storing in a catalog data store entries referencing a plurality of data object components used to generate data objects and a plurality of formatting function components to generate formatting functions, each of said data object components and formatting function components having a component identifier;
receiving, on a server computer, requests from subscribing clients for web content,
wherein each request includes a data object component identifier, a formatting function component identifier, and a subscriber identifier; and
in response to receiving one of the requests from one of the clients, said server computer (i) executing the data object component and of the formatting function component identified by the data object component identifier and the formatting function identifier included in the request to generate a data object and a formatting function, (ii) assigning specified names to the generated data object and to the generated formatting function to protect against name conflicts between the generated data object and formatting function including assigning the generated data object and the generated formatting function names based on information in the received one request, (iii) aggregating the generated output data object and formatting function into a single response, and (iv) returning said response to said one of the clients for display by said one of the clients.

12. The method according to claim 11, wherein the specified names assigned to the generated data object and the generated formatting function are reference variables based on information in the received one request.

13. The method according to claim 12, wherein the specified names assigned to the generated data object and the generated formatting function are based on the subscriber identifier in the received one request.

14. A method of serving web content to a subscribing client for display by the subscribing client, comprising:
storing in a catalog data store entries referencing a plurality of data object components used to generate data objects and a plurality of formatting function components to generate formatting functions, each of said data object components and formatting function components having a component identifier;
receiving, on a server computer, requests from subscribing clients for web content,
wherein each request includes a data object component identifier, a formatting function component identifier, and a subscriber identifier; and
in response to receiving one of the requests from one of the clients, said server computer (i) executing the data object component and of the formatting function component identified by the data object component identifier and the formatting function identifier included in the request, (ii) assigning specified names to the generated data object and to the generated formatting function to protect against name conflicts between the generated data object and formatting function, (iii) aggregating the generated output data object and formatting function into a single response, and (iv) returning said response to said one of the clients for display by said one of the clients; and
the server computer wrapping the generated data object and the generated formatting function in a protective code block wherein the formatting function and variables created by the generated data object and formatting function are not visible outside of the protective code block.

15. The method according to claim 14, wherein the one of the clients executes the formatting function via a reference variable named after the subscription identifier.

16. A program storage device readable by machine, tangibly embodying a program of instructions executable by the machine to perform a method for serving web content to a subscribing client for display by the subscribing client, said method comprising:

storing in a catalog data store entries referencing a plurality of data object components used to generate data objects and a plurality of formatting function components to generate formatting functions, each of said data object components and formatting function components having a component identifier;

receiving, on a server computer, requests from subscribing clients for web content, wherein each request includes a data object component identifier; a formatting function component identifier, and a subscriber identifier; and in response to receiving one of the requests from one of the clients, using the server computer for (i) executing the data object component and the formatting function identified by the data object identifier and the formatting function identifier included in the request to generate a data object and a formatting function, (ii) assigning specified names to the generated data object and to the generated formatting function to protect against name conflicts between the generated data object and the formatting function including assigning the generated data object and the generated formatting function names based on information in the received one request, (iii) aggregating the generated data object and formatting function into a single response, and (iv) returning said response to said one of the clients for display by said one of the clients.

17. The program storage device according to claim 16, wherein the specified names assigned to the generated data object and the generated formatting function are reference variables based on information in the received one request.

18. The program storage device according to claim 17, wherein the specified names assigned to the generated data object and the generated formatting function are based on the subscriber identifier in the received one request.

19. The program storage device according to claim 16, wherein said method further comprises using the server computer for wrapping the generated data object and the generated formatting function in a protective code block wherein the formatting function and variables created by the generated data object and formatting function are not visible outside of the protective code block.

20. The program storage device according to claim 19, wherein the one of the clients executes the formatting function via a reference variable named after the subscription identifier.

* * * * *